US007612886B2

(12) United States Patent
Guerineau et al.

(10) Patent No.: US 7,612,886 B2
(45) Date of Patent: Nov. 3, 2009

(54) FIBER-OPTIC SEISMIC SENSOR

(75) Inventors: Laurent Guerineau, Houston, TX (US); Sylvie Menezo, Nantes (FR); Jean-Paul Menard, Thouare sur Loire (FR); Mathieu Sanche, Nantes (FR); Hubert Dieulangard, Sainte Luce sur Loire (FR)

(73) Assignee: Sercel, Carquefou (FR)

( * ) Notice: Subject to any disclaimer, the term of this patent is extended or adjusted under 35 U.S.C. 154(b) by 365 days.

(21) Appl. No.: 11/265,514

(22) Filed: Nov. 3, 2005

(65) Prior Publication Data
US 2007/0008544 A1    Jan. 11, 2007

(30) Foreign Application Priority Data
Jul. 7, 2005    (FR) .................................. 05 07250

(51) Int. Cl.
G01P 15/08    (2006.01)
G01P 15/13    (2006.01)
G01B 9/02    (2006.01)

(52) U.S. Cl. .................................. 356/477; 73/514.26
(58) Field of Classification Search ................. 356/477; 73/514.26
See application file for complete search history.

(56) References Cited

U.S. PATENT DOCUMENTS

| 4,322,829 | A | * | 3/1982 | Davis et al. ................. 367/178 |
| 4,534,222 | A | * | 8/1985 | Finch et al. .................... 73/653 |
| 4,893,930 | A |   | 1/1990 | Garrett et al. |
| 5,134,882 | A | * | 8/1992 | Taylor ...................... 73/514.26 |
| 5,317,929 | A | * | 6/1994 | Brown et al. ............. 73/514.01 |
| 5,369,485 | A | * | 11/1994 | Hofler et al. ................ 356/477 |
| 5,883,308 | A | * | 3/1999 | Fersht ...................... 73/514.26 |
| 5,903,349 | A | * | 5/1999 | Vohra et al. ................. 356/477 |
| 6,018,390 | A | * | 1/2000 | Youmans et al. ............ 356/477 |
| 6,049,511 | A |   | 4/2000 | Erath |
| 6,320,664 | B1 | * | 11/2001 | Kaliszek et al. ............. 356/464 |
| 6,363,786 | B1 | * | 4/2002 | Fersht ...................... 73/514.26 |
| 6,384,919 | B1 | * | 5/2002 | Fersht et al. ................ 356/477 |
| 6,465,749 | B1 | * | 10/2002 | Kurz ..................... 177/210 FP |
| 6,496,264 | B1 | * | 12/2002 | Goldner et al. ............. 356/478 |
| 6,575,033 | B1 | * | 6/2003 | Knudsen et al. .......... 73/514.26 |
| 6,628,400 | B2 | * | 9/2003 | Goldner et al. ............. 356/477 |
| 6,650,418 | B2 | * | 11/2003 | Tweedy et al. .............. 356/477 |

(Continued)

FOREIGN PATENT DOCUMENTS

WO    WO 2004/042425    5/2004

OTHER PUBLICATIONS

Guldimann et al., "Fiber-optic accelerometer with micro-optical shutter modulation and integrated damping," Optical MEMS, 2000 IEEE/LEOS International Conference, Aug. 21-24, 2000, pp. 141-142.

Primary Examiner—Patrick J Connolly
(74) Attorney, Agent, or Firm—Law Office of Tim Cook P.C.

(57) ABSTRACT

The invention relates to a fiber-optic seismic sensor (200) with a test body (110), characterized in that the test body (110) comprises several separate dishes (113, 114, 115, 116) that are distributed around the direction of the sensitive axis of the sensor and two star-shaped elements (120, 130) placed on either side of the dishes (113, 114, 115, 116) and mechanically linking said dishes (113, 114, 115, 116) together.

16 Claims, 2 Drawing Sheets

U.S. PATENT DOCUMENTS

| | | | |
|---|---|---|---|
| 6,671,057 B2 * | 12/2003 | Orban | 356/496 |
| 6,955,085 B2 * | 10/2005 | Jones et al. | 73/514.26 |
| 7,137,299 B2 * | 11/2006 | Meyer | 73/514.27 |
| 7,243,543 B2 * | 7/2007 | Berg et al. | 356/477 |
| 7,282,697 B2 * | 10/2007 | Thomas et al. | 250/227.14 |
| 2002/0141681 A1 * | 10/2002 | Goldner et al. | 385/12 |
| 2002/0180978 A1 * | 12/2002 | Berg et al. | 356/477 |
| 2003/0081218 A1 * | 5/2003 | Orban | 356/450 |
| 2004/0237648 A1 * | 12/2004 | Jones et al. | 73/514.26 |
| 2005/0115320 A1 * | 6/2005 | Thomas et al. | 73/514.01 |
| 2006/0236762 A1 * | 10/2006 | Meyer | 73/514.26 |
| 2007/0008544 A1 * | 1/2007 | Guerineau et al. | 356/477 |

* cited by examiner

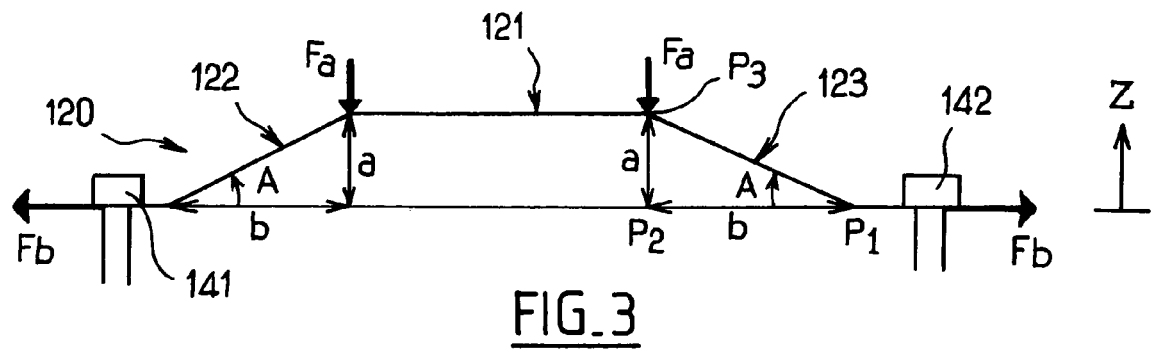
FIG_3
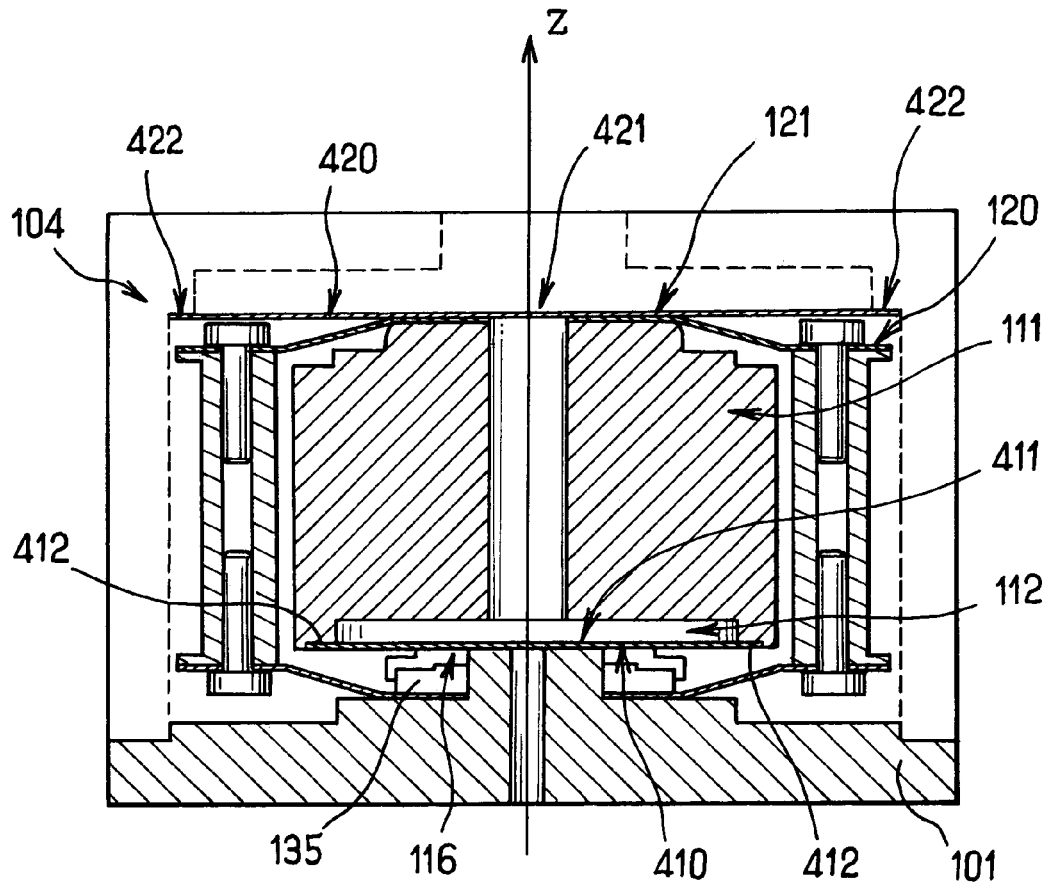
FIG_4

FIBER-OPTIC SEISMIC SENSOR

The present invention relates to the field of fiber-optic seismic sensors.

More precisely, the present invention relates to fiber-optic seismic sensors of very high sensitivity, based on a flextensional structure.

The present invention relates in particular to fiber-optic seismic sensors that are vibration sensors, such as an accelerometer.

The present invention applies in particular to the field of oil exploration and can be applied to any field employing seismic sensors.

Those skilled in the art know that there are many different forms of fiber-optic seismic sensors.

Fiber-optic seismic sensors use an interferometric method to interpret external perturbations (pressure, vibration, etc.) applied to an optical fiber, which perturbations correspond to a quantity to be measured. Certain properties of the optical fiber (index and length) are modified through the effect of these quantities to be measured. The change in these properties of the optical fiber produces changes in the propagation time of the optical signals propagating therein. The changes in propagation time of the optical signals, interpreted by an interferometric method, are thus representative of the perturbations of the quantities to be measured.

Some of these fiber-optic seismic sensors, based on measurement of the strain and/or on the change in index of the optical fiber, are formed from an optical fiber sensitive to the quantities to be measured and subjected to these quantities to be measured, either directly or indirectly by means of a test body.

Those skilled in the art have proposed many test bodies for transmitting the effects of the quantities to be measured to the optical fiber. Document U.S. Pat. No. 5,369,485 proposes for example a fiber-optic seismic sensor comprising a pair of sensitive optical fibers, each of these optical fibers being fixed in the form of a flat spiral to a respective disk. The disks, forming a test body, are elastic so as to be able to transmit, through their strain, the quantities to be measured to the pair of optical fibers. In this type of seismic sensor, the optical fibers, fixed directly to the test body (the disk), experience a strain directly linked to the strain of this test body, and may prove to be not very sensitive. Fiber-optic seismic sensors of higher sensitivity have therefore been proposed.

These very sensitive fiber-optic seismic sensors are usually formed from a test body forming a flextensional structure. This flextensional structure comprises a first part subjected to the quantity to be measured, and a second part which is connected to the first part and is in direct contact with the optical fiber.

Document U.S. Pat. No. 6,049,511 discloses a fiber-optic seismic sensor, and more precisely a hydrophone (an acoustic pressure sensor), in which the flextensional structure of the test body allows the force to be amplified. A pressure applied to the surface forming the first part of this structure transmits the strain that it undergoes to the second part of the structure, which is approximately perpendicular to the first part, via a bearing point. This second part, in direct contact with the optical fiber, is free of any displacement and deforms all the more as it is away from the bearing point.

Document WO 2004/042425 discloses a fiber-optic seismic sensor, and more precisely a vibration sensor (or accelerometer) in which the flextensional structure of the test body makes it possible to amplify a force. The first part of this structure, undergoing the action of the quantity to be measured, consists of an elliptical element. A quantity applied along the minor axis of this elliptical element is transmitted to a second part of the structure, consisting of two elements of rounded shape that are placed respectively on either side of the major axis of the elliptical element. Thus, this seismic sensor amplifies the force applied by the quantity to be measured, corresponding to the ratio of the length of the major axis to the length of the minor axis of the elliptical element. The force amplification thus generated produces a higher strain in the optical fiber and therefore a greater sensitivity.

These fiber-optic seismic sensors based on a flextensional structure therefore improve the sensitivity along the sensitive axis of the sensor.

However, in the case of a vibration sensor, a good number of proposed structures exhibit undesirable (spurious) vibration modes along axes other than the sensitive axis of the sensor.

Current fiber-optic seismic sensors, pressure sensors and vibration sensors must therefore be improved as there is a need for an ultrasensitive fiber-optic seismic sensor. In particular, in the case of vibration sensors, there is a need for a sensor having greater insensitivity to spurious vibration modes.

This object is achieved within the context of the present invention thanks to a fiber-optic seismic sensor with a test body, characterized in that the test body comprises several separate dishes that are distributed around the direction of the sensitive axis of the sensor and two star-shaped elements placed on either side of the dishes and mechanically linking said dishes together.

Other features, objects and advantages of the present invention will become apparent on reading the detailed description that follows, in conjunction with the appended drawings, given by way of example but implying no limitation, in which drawings:

FIG. 3 shows a diagram of a star-shaped element employed in a seismic sensor according to the present invention in a view corresponding to the sectional view of FIG. 2; and FIG. 4 shows a sectional view of a vibration sensor according to the present invention and provided with additional springs.

Figure 1:
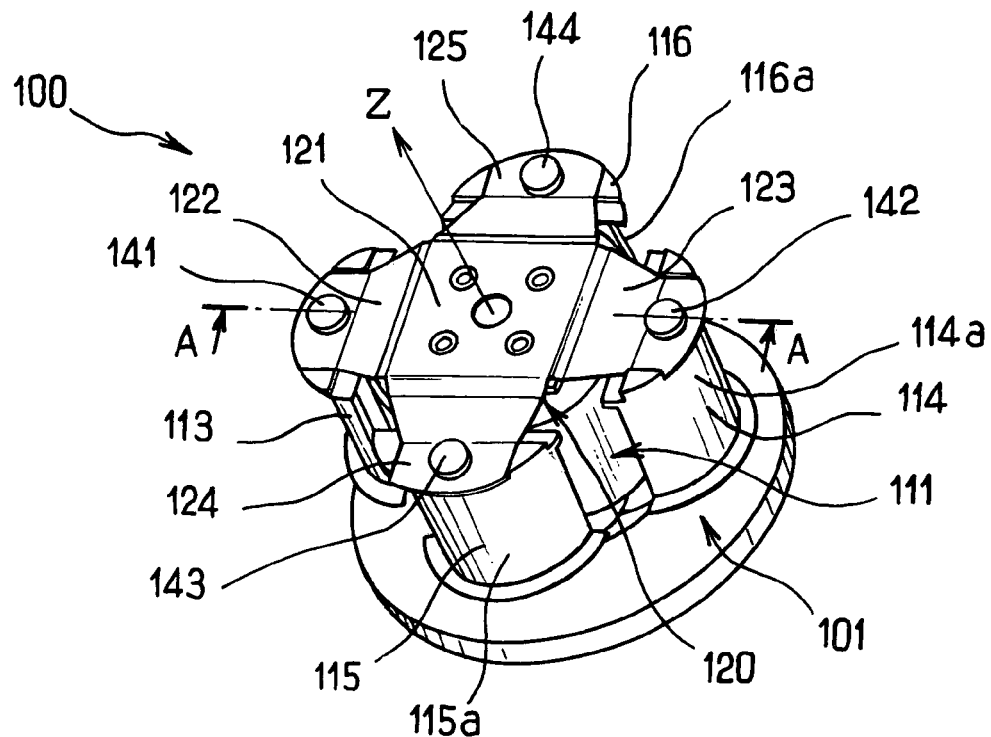
FIG. 1 shows a perspective view of a fiber-optic vibration sensor according to the present invention.
Figure 2:
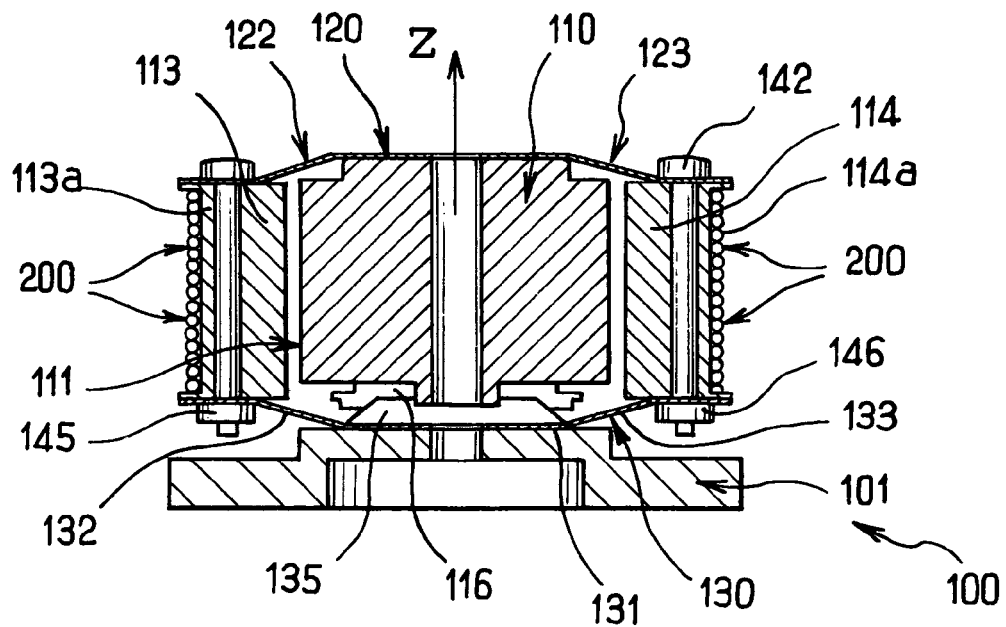
FIG. 2 shows a sectional view of the vibration sensor of FIG. 1.

FIGS. 1 and 2 show respectively, in perspective view and in sectional view (section A-A), a preferred embodiment of a vibration sensor 100 according to the present invention. This vibration sensor 100 consists of a base 101 of approximately circular cross section. The width of the base 101 is designed to ensure good stability of the vibration sensor 100, and is preferably greater than the width of the test body 110.

The test body 110 is preferably a symmetrical body of revolution about an axis Z, corresponding to the sensitive axis of the sensor. The test body 110 comprises a seismic mass 111 of the test body 110 of approximately cylindrical shape, dishes 113, 114, 115, 116 that are separate from one another and distributed around the seismic mass 110, and therefore around the direction of the sensitive axis of the sensor, a star-shaped element 120 fastened to the upper faces of the dishes 113, 114, 115, 116 and a star-shaped element 130, of similar shape to the element 120, fastened to the lower faces of the dishes 113, 114, 115, 116.

The star-shaped element 120 is formed from a plate 121, called the top plate, and laminae 122, 123, 124, 125 called upper laminae, via which the star-shaped element 120 is fastened to the dishes 113, 114, 115, 116. Similarly, the star-shaped element 130 is formed from a plate 131, called the bottom plate, and from laminae, called lower laminae 132, 133, 135, there being the same number of these as the upper laminae (only three lower laminae can be seen in FIG. 2), via which the element 130 is fastened to the dishes 113, 114, 115, 116. Thus, the dishes 113, 114, 115, 116 are mechanically linked together by means of the star-shaped elements 120, 130 that are placed on either side (in the lower part and upper part) of said dishes. It will be noted in FIG. 2 that the dish 116 and the lower lamina 135 do not lie in the plane of section A-A, and for this reason they have been shown hatched.

The star-shaped element 120 mechanically links the seismic mass 111 to the respective upper faces of the dishes 113, 114, 115, 116. More precisely, the star-shaped element 120 mechanically links the upper face of the seismic mass 111 to the respective upper faces of the dishes 113, 114, 115, 116. For this purpose, the top plate 121 is fastened to the seismic mass 111 by any suitable means.

Similarly, the star-shaped element 130 mechanically links the lower face of the dishes 113, 114, 115, 116 to the base 101. More precisely, the bottom plate 131 and the base 101 are fastened together by any suitable means.

The upper laminae 122, 123, 124, 125 and the lower laminae 131, 132, 135 (the lower lamina not shown) are fastened to the upper and lower faces, respectively, of the dishes 113, 114, 115, 116 by any suitable means. As a nonlimiting example, bolts 141, 142, 143, 144, threaded at their lower ends in order to receive a nut 145, 146 may be provided.

The dishes 113, 114, 115, 116 and the seismic mass 111 are not in direct contact so that axial vibrations (that is to say vibrations along the direction of the sensitive axis of the sensor) detected by the base are transmitted transversely to the dishes 113, 114, 115, 116 via the lower laminae 132, 133 and upper laminae 122, 123, 124, 125.

Each of the dishes 113, 114, 115, 116 is of rounded shape on its face 113a, 114a, 115a, 116a radially external to the sensor. The optical fiber 200 is wound around these dishes 113, 114, 115, 116 and more precisely is in contact with the faces 113a, 114a, 115a, 116a. The rounded shape of these radially external faces 113a, 114a, 115a, 116a minimizes the stresses in the optical fiber 200 due to winding and also minimizes the optical losses. The nature of the material employed and the surface roughness of the dishes 113, 114, 115, 116 are also designed to minimize the stresses and the optical losses in the optical fiber 200. Preferably, the radially external faces 113a, 114a, 115a, 116a are in the form of semicircles and the radially internal faces of the dishes 113, 114, 115, 116 are flat, the dishes thus forming semicylinders.

FIG. 3 shows a diagram of the element 120 extracted, along the section A-A. In this sectional view, two upper laminae 122 and 123 and the top plate 121 of the element 120 can be seen. More precisely, a lamina 122, 123 comprises a horizontal first part (that is to say a part perpendicular to the direction of the sensitive axis of the sensor, and consequently perpendicular to the Z axis) fastened to a dish and an inclined second part (or inclined plane), inclined at an angle A relative to the horizontal direction, which joins the plate 121 to the horizontal first part.

When a force $F_a$ perpendicular to the top plate 121 is applied to said plate 121, the laminae convert the force $F_a$ into a horizontal component force $F_b$, the origin of which lies at a point where the bolts 141, 142 fasten the laminae 122, 123, respectively. The ratio of the forces $F_b/F_a$ is proportional to the ratio of the lengths b/a. The lengths a and b are for example defined as being the respective lengths of the sides $P_2P_3$ and $P_1P_2$, respectively, of the imaginary right-angled triangle $P_1P_2P_3$ from $P_2$, the hypotenuse of said triangle corresponding to that part of the lamina 123 that is inclined to the horizontal. The ratio b/a is chosen so as to provide a force amplifier, that is to say when b/a>1, thereby accentuating the strains in the optical fiber 200. In other words, choosing the ratio b/a>1 is equivalent to choosing an angle of inclination A of strictly less than 45°.

In the case of a vibration sensor, when that the test body 110 is subjected to a normal vibration coming from the base 101, relative movement is induced between the seismic mass 111 and the base 101. This relative movement between the base 101 and the seismic mass 111 is a movement whose main component is a translation along the Z axis (the sensitive axis of the sensor), making it easier for the dishes 113, 114, 115, 116 to move closer together or further apart along a radial direction, and therefore deforming the optical fiber 200. However, there are vibration modes other than the principal vibration mode, that is to say transverse vibration modes, which may prove to be problematic.

The number of laminae contained in a star-shaped element 120, 130 is not limited to four, as shown in FIGS. 1 to 5. It is quite conceivable to provide, within the context of the present invention, from two to an infinite number of laminae on a star-shaped element 120, 130, which are therefore distributed around the sensitive axis (Z axis) of the sensor within the test body. Preferably, the laminae (like the dishes) are uniformly distributed around the sensitive axis of the sensor, that is to say they are distributed at regular angular intervals, the angle separating two successive laminae (or dishes) being equal to $2\pi/n$, where n is the number of laminae (or the number of dishes) of the star-shaped element. However, it may be envisioned that the laminae (like the dishes) are not uniformly distributed around the sensitive axis of the sensor.

However, it turns out that the number of laminae per star-shaped element 120, 130 needed is at least four so that the spurious vibration modes of the sensor have little effect on the quality of the measurement made in the principal vibration mode (which is along the sensitive axis of the sensor, corresponding to the Z axis).

In general, when using star-shaped elements 120, 130, the larger the number n of laminae the better and more symmetrical the sensor, and the more the sensor is insensitive to spurious vibration modes. In the case of a vibration sensor, the sensor then responds only to the principal vibration mode, which is the desired mode.

Also generally, when using star-shaped elements 120, 130, the larger the number n of laminae, the larger the strain of the optical fiber 200 (for an identical force), thereby increasing the sensitivity of the seismic sensor. Furthermore, the larger the number of laminae, the closer the dishes. This facilitates winding of the optical fiber 200 and makes it easier to apply a constant pretension force over the entire length of the optical fiber 200.

FIG. 4 shows means capable of increasing the transverse insensitivity of the sensor. FIG. 4 is a sectional view of a vibration sensor according to the present invention, in which the means capable of increasing the transverse insensitivity of the sensor are additional springs 410, 420. Specifically, in the case of a vibration sensor, it may be envisioned to provide a first additional spring 410 located at the base of the seismic mass 111 and/or a second additional spring 420 which is itself located on the top of the seismic mass 111.

More precisely, the first additional spring 410, of approximately circular shape, is fastened at its center 411 to the base 101 of the sensor. The center 411 of the first additional spring 410 is not in contact with the seismic mass 111, a cavity 112 being provided for this purpose in the seismic mass 111. However, the periphery 412 of the spring 410 is fastened to the seismic mass 111. The seismic mass 111 and the first additional spring 410 are in-contact with each other only on the periphery 412 of the spring 410.

The second additional spring 420 is fastened only at its center 421 to the top plate 121 of the star-shaped element 120, this element 120 itself being fastened to the seismic mass 111. This spring 420 is also fastened, only via its periphery 422, to a dish 104, which is integral with the base 101 of the sensor.

These springs 410 and/or 420 increase the transverse insensitivity of the sensor in the sense that they guide the test body 110 along the direction of the sensitive axis of the sensor (the Z axis). This is because these springs have a low stiffness in a chosen direction, in this case the direction of the sensitive axis of the sensor, and a high stiffness in all other radial directions owing to their approximately circular shape.

When the test body 110 is subjected to a normal vibration coming from the base 101, the relative movement induced between the seismic mass 111 and the base 101 is not influenced by the additional springs 410, 420, these having a low stiffness along the direction of the sensitive axis of the sensor. However, when the test body 110 is subjected to transverse vibrations, that is to say those directed along a direction different from the direction of the sensitive axis of the sensor, the purpose of the additional springs 410, 420 is to provide radial stiffness that will minimize the transverse displacements of the seismic mass 111. Consequently, the optical fiber undergoes little or no variation in length due to these transverse vibrations.

The influence of the transverse vibration modes is reduced, thus preventing a spurious vibration, transverse to the direction of the sensitive axis, from being transmitted to the seismic mass 111.

When these springs are used, the vibration sensor must provide a cover. The use of such springs for implementing the invention is not obligatory. Furthermore, in the absence of such springs 410, 420, the vibration sensor may or may not include a cover.

Typically, within the context of seismic applications, a vibration sensor according to the present invention is an accelerometer.

The invention claimed is:

1. A fiber-optic seismic sensor (200) comprising a test body (110) having a sensitive axis and several separate dishes (113, 114, 115, 116) distributed around the direction of the sensitive axis, each of the dishes having an upper side and a lower side; a first star-shaped element fastened to the upper side of the dishes; and a second star-shaped element fastened to the lower side of the dishes, wherein the first star-shaped element and the second star-shaped element mechanically link the dishes together.

2. The sensor according to claim 1, wherein the test body comprises a seismic mass, wherein the dishes are distributed around the seismic mass having the sensitive axis.

3. The sensor according to claim 1, further comprising an optical fiber wound around the dishes.

4. The sensor according to claim 2, wherein each dish comprises an upper face on the upper side and a lower face on the lower side, wherein the first star-shaped element mechanically links the seismic mass to the upper faces of the dishes and the second star-shaped element mechanically links the lower face of the dishes to a base.

5. The sensor according to claim 2, wherein the seismic mass comprises an upper face and each dish comprises an upper face on the upper side, wherein the first star-shaped element comprises a top plate mechanically linked to the upper face of the seismic mass and several upper laminae which are each fastened to the upper face of a respective dish.

6. The sensor according to claim 5, wherein the upper laminae each include an inclined plane, inclined to the horizontal direction at an angle A of strictly less than 45°.

7. The sensor according to claim 2, wherein each dish comprises a lower face on the lower side, wherein the second star-shaped element comprises a bottom plate fastened to a lower face of a base and several lower laminae that are each fastened to the lower face of a respective dish.

8. The sensor according to claim 7, wherein the lower laminae each include an inclined plane, inclined to the horizontal direction at an angle A of strictly less than 45°.

9. The sensor according to claim 1, wherein each dish has a radially external face of rounded shape.

10. The sensor according to claim 1, wherein the dishes form semicylinders.

11. The sensor according to claim 2, wherein the seismic mass is of approximately cylindrical shape, the axis of the cylinder thus defined coinciding with the sensitive axis.

12. The sensor according to claim 1, wherein the dishes are placed at regular angular intervals around the direction of the sensitive axis.

13. The sensor according to claim 7, wherein an additional spring is placed at a lower side of the seismic mass and in contact with the seismic mass only via its periphery, and in contact with the base only via its center via which it is fastened to the base.

14. The sensor according to claim 7, wherein an additional spring is placed on the top of the seismic mass and fastened to the seismic mass only at its center, and fastened only via its periphery to a cover integral with the base.

15. The sensor according to claim 5, wherein the additional spring is fastened to the top plate of the first star-shaped element, wherein the additional spring, the top plate and the seismic mass are fastened together.

16. The sensor according to claim 2, wherein the dishes and the seismic mass are not in direct contact.

* * * * *